United States Patent
Cole

[11] 3,908,474
[45] Sept. 30, 1975

[54] BICYCLE IMPROVEMENT THROUGH PROVISION OF AN AUTOMATIC TRANSMISSION

[76] Inventor: Eli Wm. Cole, 1206 W. Foster Ave., Chicago, Ill. 60640

[22] Filed: Oct. 23, 1973

[21] Appl. No.: 408,917

[52] U.S. Cl.................................. 74/117; 280/238
[51] Int. Cl............................................ F16h 29/04
[58] Field of Search...... 74/117, 116; 280/236, 237, 280/238; 123/41 R

[56] References Cited
UNITED STATES PATENTS

| | | |
|---|---|---|
| 528,956 | 10/1894 | Lippy et al.......................... 280/238 |
| 3,004,440 | 10/1961 | Pernik................................... 74/117 |
| 3,213,697 | 10/1965 | Hartmann et al..................... 74/117 |
| 3,340,743 | 9/1967 | Stageberg............................. 74/116 |
| 3,362,389 | 1/1968 | Johnson............................... 123/41 |

FOREIGN PATENTS OR APPLICATIONS 872,568 2/1942 France............................. 280/238

Primary Examiner—Wesley S. Ratliff, Jr.

[57] ABSTRACT

An automatic transmission for a bicycle is provided by a continuously variable ratio transmission means within the drive train of a bicycle, the ratio being adjustable by a handle-grip throttle. Operator error can be lessened by the provision of an optional governor which may be overridden if necessary.

4 Claims, 10 Drawing Figures

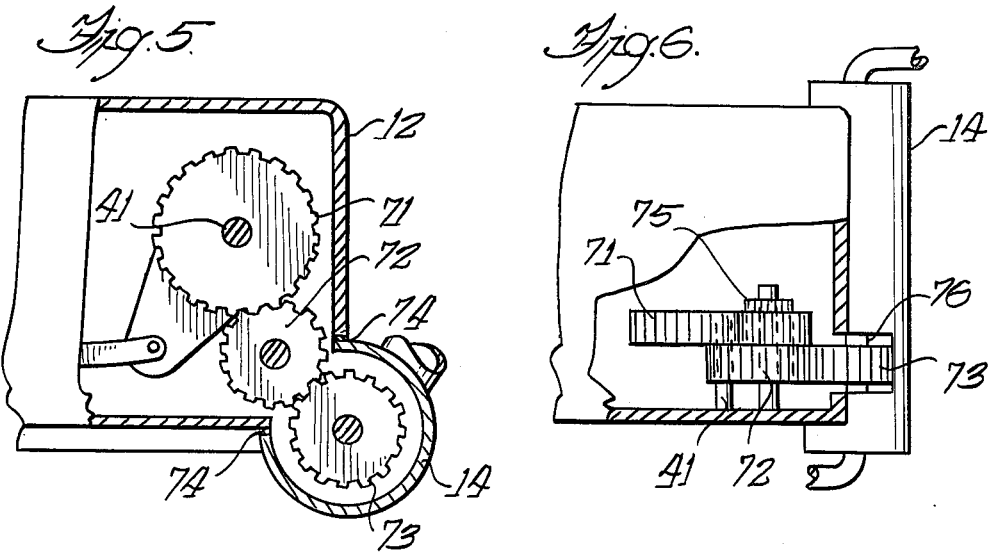
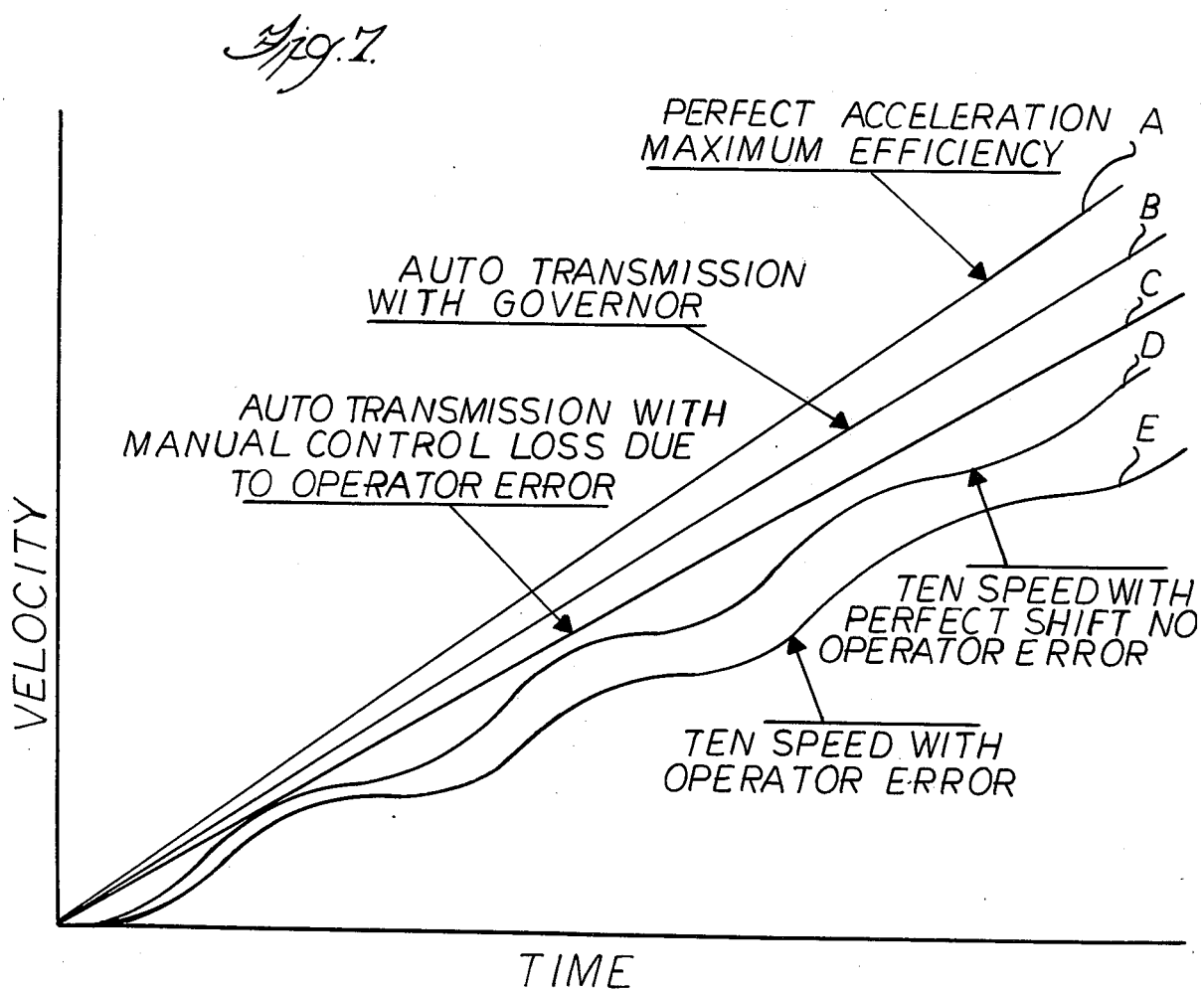

BICYCLE IMPROVEMENT THROUGH PROVISION OF AN AUTOMATIC TRANSMISSION

BACKGROUND OF THE INVENTION

This invention relates in general to a means for improving a bicycle by providing an automatic transmission for the bicycle.

It is well known that, to assist in the forward movement of a bicycle, it is quite helpful to provide a series of forward gears to supply a series of ratios between the number of revolutions imparted to the pedal shaft and sprocket through the pedals and the number of revolutions of the rear wheel. Well-known commercial bicycle transmissions provide, for example, a series of 3 gears, 5 gears and 10 gears.

As is well known in the art, as the number of gears increases, the degree of complexity, frequency of repair and cost of manufacture greatly increases. Moreover, the results obtained have been anything but completely satisfactory, particularly in the less-expensive, 10-gear bicycle transmissions. These prior art transmissions are delicate and are susceptible to damage and require precise adjustments so as to avoid the "loss" of several gears and to prevent excessive slippage during the operation of the bicycle.

The present invention provides a durable bicycle transmission which affords a non-stepped, constantly variable range of ratios between the input at the pedals and the output at the rear wheel. As a result, there is obtained a means for transforming power exerted at the pedals for the forward movement of the bicycle. Each stroke of the pedal is smoothly and efficiently transferred to the rear wheel, without the need for pauses in pedaling while the ratio is changing and without loss of efficiency due to slippage prevalent in previously used gear systems. The operator of the bicycle can simply continue pedaling while the ratio is continuously changed.

Moreover, one embodiment of the presently described structure of this invention can be easily assembled onto a standard bicycle.

SUMMARY OF THE INVENTION

The invention consists of a variable speed transmission, mounted on a bicycle and uses a variable speed throttle. The transmission is mounted on the frame near the pedal drive sprocket, which is suitably connected thereto so as to provide input power. The output of the transmission is suitably connected to the sprocket of the rear wheel.

By adjusting the throttle, the linkage within the transmission is varied so as to provide a constantly varied ratio between the input and output rotational speeds of the transmission.

The transmission utilized can be of various constructions, provided there is produced a non-stepped constantly variable capacity to adjust the ratio of input rotation to output rotation. Described herein is a form of a particular type of mechanical variable speed drive or transmission. Transmissions of the variable speed type suitable for use herein run from an output speed of "zero" up to a maximum safe output speed of operation for the particular bicycle structure utilized.

BRIEF DESCRIPTION OF THE DRAWINGS

FIG. 5 is a cut-away partial side view of the transmission that illustrates a further embodiment wherein the drive from the pedals to the input shaft is a direct gear drive.

FIG. 6 is a cut-away partial top view of the transmission of the embodiment of FIG. 5.

FIG. 7 is a theoretical graphical representation comparing the efficiency of the present invention with prior art bicycles.

DETAILED DESCRIPTION OF THE INVENTION

Figure 1:
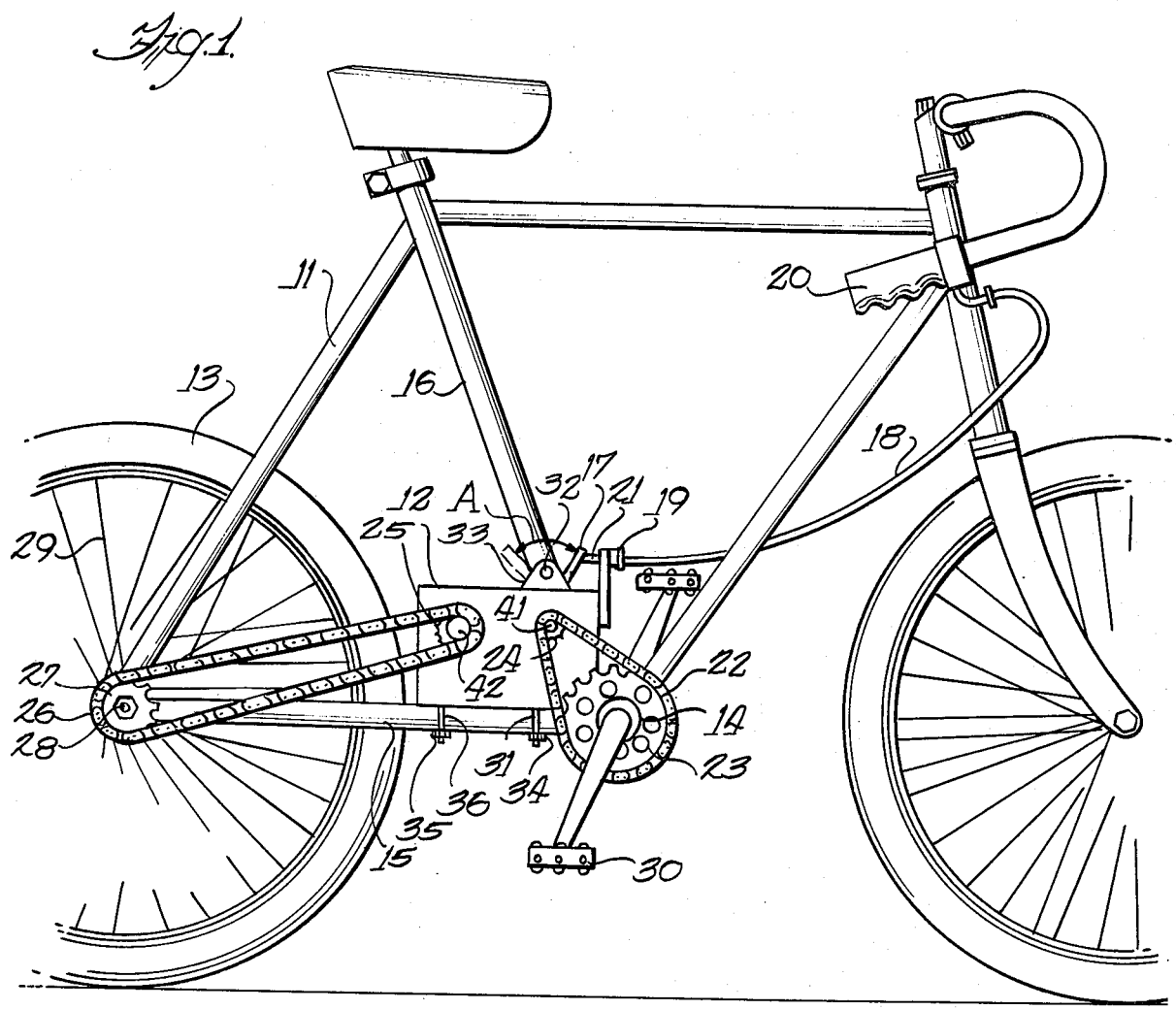
FIg. 1 is a side plan view of an arrangement of the transmission system on a standard bicycle frame.

Referring to FIG. 1, there is shown the present invention as it has been assembled onto a standard bicycle 11. The variable speed drive or automatic transmission member 12 is positioned just in front of the rear wheel 13 and the pedal shaft casing 14. The transmission is connected at the bottom to horizontal bicycle frame member 15. It is connected at its top portion to approximately vertical bicycle frame member 16.

A control bar member 17 protrudes from the top of the transmission member 12. Bar member 17 is so positioned that it may move as a lever through arc A.

The protruding end of bar member 17 is connected to control cable 21. Any suitable arrangement of the connection between cable 21 and bar member 17 may be utilized. Depicted in the drawing is a Bodine-wire control arrangement, generally indicated by reference numeral 19. The other end of cable 21 is connected to a grip control throttle 20 of conventional construction. The operation of the throttle is such that when same is rotated in one direction, the rear portion of cable 21 within cable encasement member 18 is pushed out of cable encasement member 18, thereby moving in a rearward direction the control bar member 17. Likewise, when the throttle is rotated in the opposite direction, the cable 21 pulls control bar 17 toward the forward position thereof.

Chain member 22 connects pedal sprocket 23 with transmission input gear member 24. Transmission member 12 mechanically connects input gear member 24 with output gear member 25, the ratio relationship afforded by the connection through transmission member 12 being determined by the position of control bar member 17.

A second chain member 26 connects output gear member 25 with gear member 27, which is rigidly connected to rear axle 28, connected to wheel 13 by spokes 29.

When the bicycle operator rotates pedal shaft 14 by applying torque to pedals 30 (only one being shown for clarity), rear wheel 13 rotates so as to provide forward motion to the bicycle, provided transmission member 12 is adjusted for anything other than zero speed. The extent of rotation of wheel 13 provided by the torque applied to pedals 30 depends upon the position of control bar member 17. A change in the extent of rotation of wheel 13 is effected in a smooth, unstepped manner by a movement of the position of control bar member 17.

Figure 2:
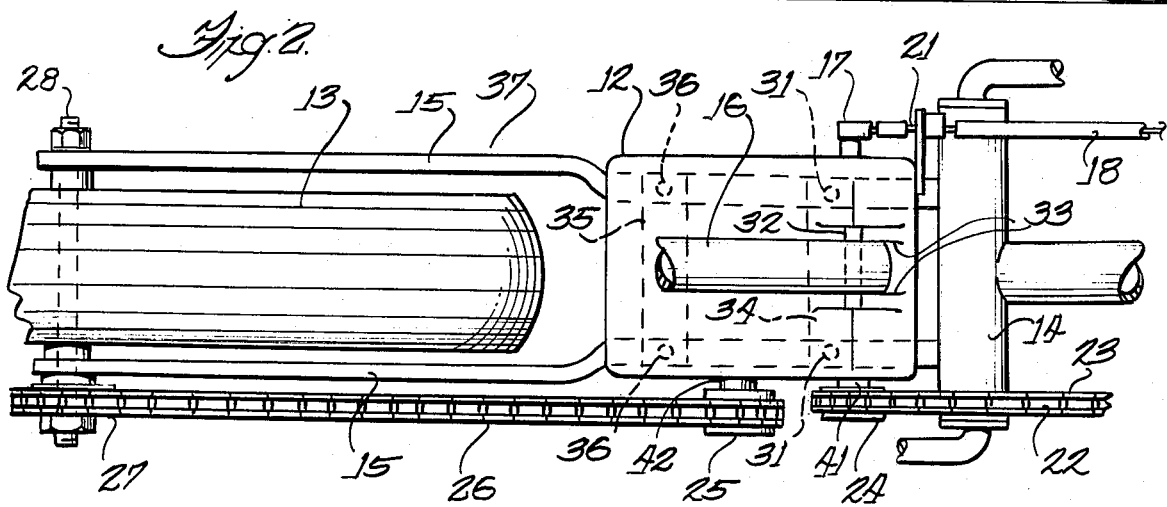
FIG. 2 is a top view of a major portion of the transmission system, from which has been removed for clarity, the upper portion of the bicycle frame.

As can be seen from FIGS. 1 and 2, the transmission member 12 readily mounts on a standard bicycle frame once a portion of substantially vertical frame member 16 is cut away. Frame member 16 is then secured to the top of the casing of transmission member 12 by means of brackets 33 and fastening member 32. Similarly, the bottom of the casing of the transmission member is secured to the substantially horizontal frame members 15 by means of fastening members 31. Optional support plate 34 may be provided, said support plate 34 spanning horizontal frame members 15. The bottom casing of transmission member 12 may, if desired, also be secured to horizontal cross frame member 37 by means of fastening members 36. Additional strength may be supplied by the use of optional support member 35.

Figure 3:
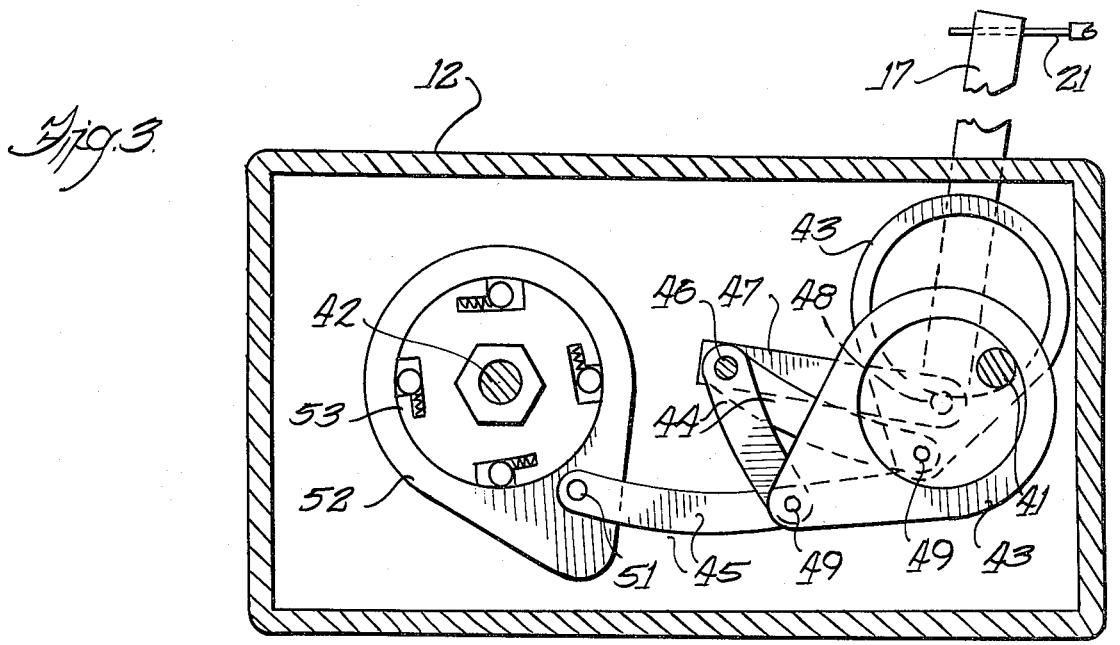
FIG. 3 is a cut-away side view of a type of variable speed drive transmission utilizable with the invention, depicting the mechanical arrangement within such transmission.

FIG. 3 is illustrative of the mechanical operation of a transmission member suitable for use with the present invention. Other particular structures of the variable speed drive or transmission member would be suitable for application with the present invention.

Figure 4:
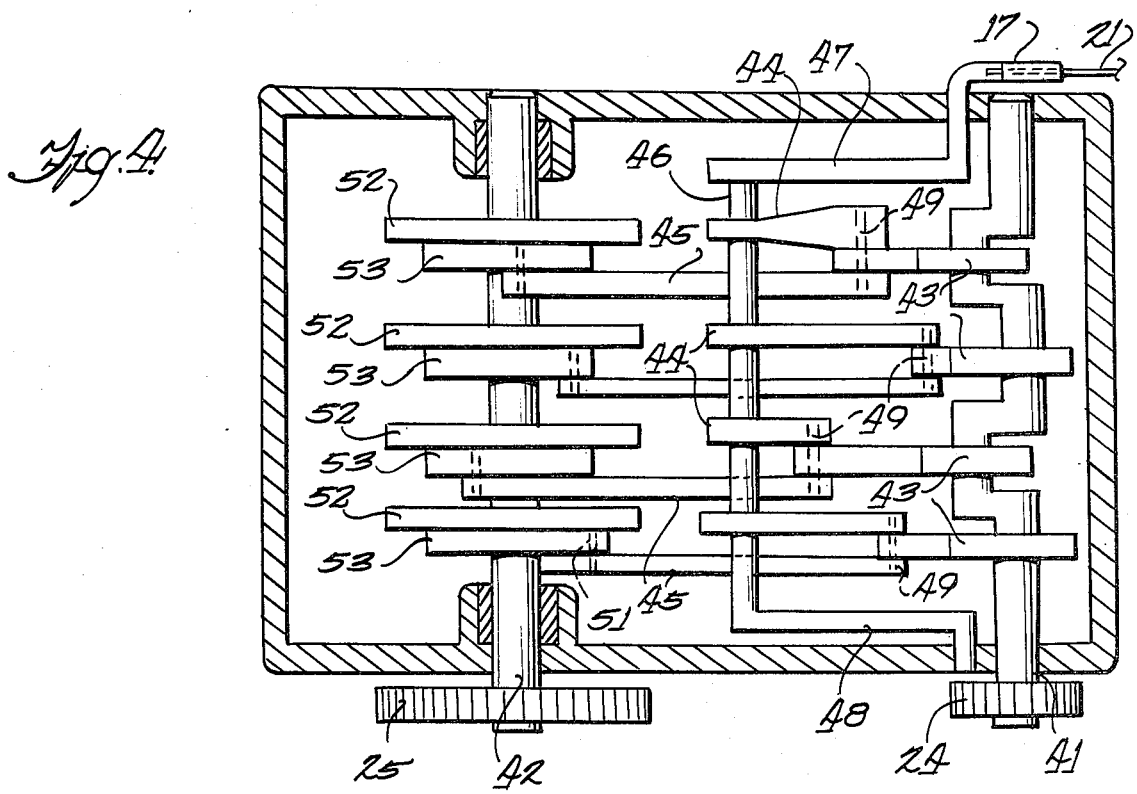
FIG. 4 is a cut-away top view of a type of variable speed drive transmission utilizable with this invention, depicting the mechanical structure of such transmission.

The particular structure shown in FIGS. 3 and 4 converts rotational motion supplied through input shaft 41 into a piston-type motion, which is in turn converted to an arcuate motion (the extent of which is controlled by the position of control bar member 17), which arcuate motion is then converted back into rotational motion and transmitted through output shaft member 42. Input shaft member 41 is securely fastened to input gear member 24, and output shaft member 42 is securely fastened to output gear member 25.

Pivotally connected to input shaft member 41 are a plurality of cam members 43, thereby forming a cam shaft. Such cam shaft converts the input rotational motion into the piston-type motion. Pivotally connected by pivot pins 49 to the lower portion of each cam member 43 is a fulcrum member 44 and a linkage arm 45. The other end of each fulcrum member 44 is pivotally connected to internal control arm 47 through pivot pin 46. As can be best seen in FIG. 4, pin 46 is rigidly connected to inner control arm 47, pivotally connected to each fulcrum arm 44, and rigidly connected to L-shaped shaft member 48. The other end of each linkage arm 45 is pivotally connected by pivot pins 51 to the respective clutch means which are rigidly connected to output shaft 42.

The clutch means includes main clutch member 52 and clutch connector members 53. Main clutch member 52 performs the function of converting the arcuate motion back into one-way rotational motion. This is accomplished by sprag means 50, shown in FIG. 3, a portion of a connector member having been removed for clarity.

Varying the positioning of control member 17 varies the position of fulcrum members 44, thereby varying the extent of conversion of piston-type motion into arcuate motion. When control arm 17 is set at zero speed, no conversion into arcuate motion is accomplished.

With the present invention, it is possible for the bicyclist to supply power at the pedal 30, which power can be transmitted to the rear wheel 13 in a smooth and efficient continuous series of ratios. The particular mechanical structure of the transmission member 12 may be varied by one skilled in the art without departing from the spirit and scope of the present invention.

In an alternate embodiment, shown in FIGS. 5 and 6, the chain member 22 is replaced by a direct-drive gear arrangement. Onto the pedal shaft 76 within pedal shaft casing 14 there is rigidly secured a first gear member 73 located within casing 14. The top, rear sector of casing 14 is cut away in the immediate vicinity of first gear member 73. Also, the casing of transmission member 12 is cut away so that the first gear member may mesh with second gear member 72, pivotally mounted within the casing of transmission member 12. The cut-away surface of casing 14 is in face-to-face alignment with the cut-away surface of the casing of the transmission member 12. A sealing member 74 is in contact with and positioned between these two cut-away surfaces.

Adjacent to second gear member 72 is a reduction gear member 75 which engages input gear member 71 located on input shaft member 41. The ratio of the number of revolutions of input gear member 75 to the number of revolutions of the first gear member 73 should be within the range of approximately 10 to 1 to 15 to 1.

Figure 8:
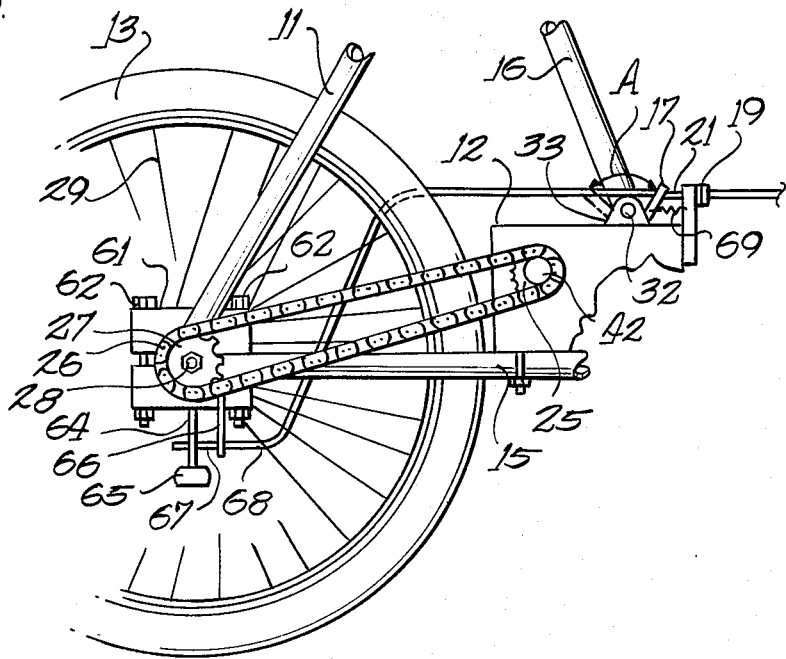
FIG. 8 is a side plan view of the rear wheel and transmission assembly showing an external governor means.
Figure 9:
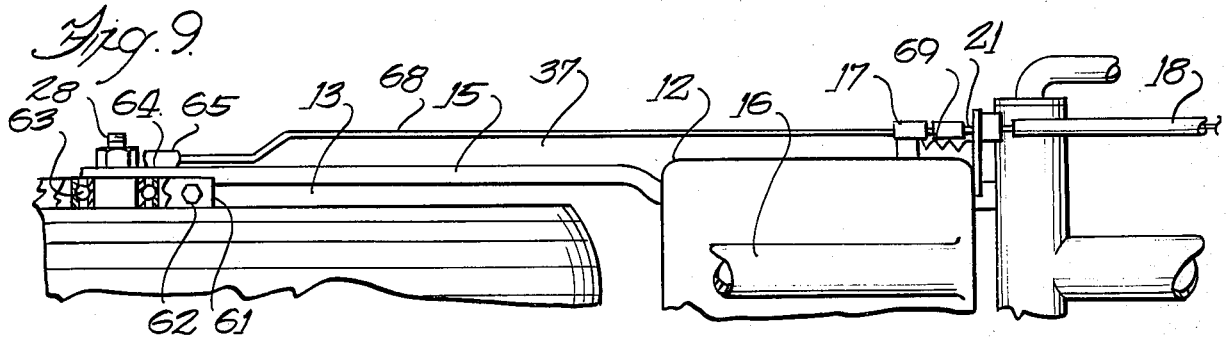
FIG. 9 is a top view showing the external governor.
Figure 10:
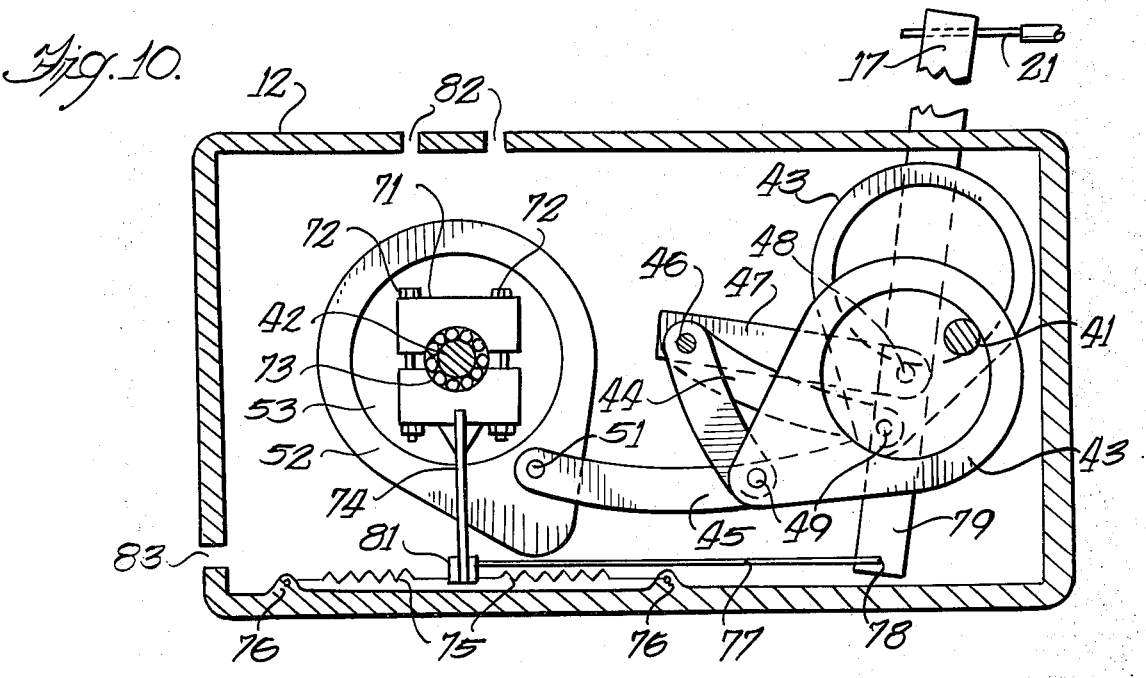
FIG. 10 is a cut-away side view of a transmission means including an internal governor means.

A governor means, two embodiments being shown in FIGS. 8, 9 and 10, may be provided as an optional feature so as to lessen operator error caused by failure of the operator to turn the control throttle 20 at proper times when the speed of the bicycle is increased or decreased, for example when ascending or descending an incline. The two embodiments depict an external governor means and an internal governor means.

The external governor means of FIGS. 8 and 9 includes a pillow block 61 with bearing means 63 being positioned between the pillow block 61 and the rear axle 28. Depending from the pillow block 61 is a hanger member 64, from which hangs a weight 65. Hanger member 64 is connected to a cable 67 within a cable casing 68, to form, for example, a Bodine-wire arrangement. The cable casing 68 is firmly attached to a support member 66 depending from horizontal bicycle frame member 15. The other end of cable 67 is connected to the control bar member 17. When employing this optional feature, the control bar member 17 should be biased by a resilient member 69.

The bearing means 63 rotates with the rear axle 28 so as to produce a drag on the pillow block 61 which causes a pull or a push on cable 67 thereby causing a corresponding movement of control bar member 17, with the result that the transmission member is automatically adjusted in direct response to changes in the speed of rotation of rear wheel 13.

The extent of drag can be changed depending upon the leg strength of the operator by use of adjustment means such as shims or adjusting bolts 62.

An internal governor means is shown in FIG. 10. The internal governor means performs the same function as the external governor means. It includes a pillow block 71 with bearing means 73 being positioned between the pillow block 61 and the output shaft member 42. Attached to and depending from the pillow block 61 is an internal hanger member 74. By means of a connection member 81 (which may be threaded onto a push member 77), internal hanger member 74 is attached to push member 77. Push member 77 is pivotally connected to an extension 79 of control bar member 17. The internal hanger member 74 is biased by two spring members 75 extending between the bottom end of internal hanger member 74 and brackets 76 secured to the bottom internal surface of the casing of transmission member 12. The spring members 75 are disposed on either side of internal hanger member 74, substantially parallel to push member 77.

The bearing means 73 rotates with output shaft member 42 so as to produce a drag on the pillow block 71 which causes a pull or a push on push member 77, thereby causing a corresponding movement of extension 79 and control bar member 17, with the result that the transmission member 12 is automatically adjusted in direct response to changes in the speed of rotation of output shaft member 42.

The degree of drag can be varied depending upon the leg strength of the operator by use of adjustment means 72, access to which may be obtained through adjustment openings 82 which may include covers (not shown). Another adjustment opening 83 may be provided to adjust the positioning of push member 77. Also a cover (not shown) may be provided.

Even when the optional governor means, either internal or external, is provided, it can be overridden by turning control throttle 20 (FIG. 1) should it be desired to increase or decrease the ratio of the transmission member.

FIG. 7 illustrates the efficiency and superiority of the present invention over a conventional bicycle having a stepped-gear arrangement, for example a ten-speed transmission.

Curve A illustrates the relationship between velocity and time with an ideal transmission having optimum efficiency. Curve B illustrates the relationship achievable by the constantly variable transmission of the present invention when coupled with an operator-error lessening device such as the optional governor of this invention. Curve C shows the efficiency obtainable by the present invention without utilization of the governor, the degree of efficiency being lowered due to operator error in failure to turn the control throttle 20 at the optimum time to change the transmission ratio as the speed increases.

Curves D and E illustrate the maximum theoretical efficiency obtainable from a conventional bicycle, such as one having ten forward gears or speeds. The "dips" in these two curves show that just after a gear shift there is a decrease in change in velocity relative to change in time. The efficiency increases for a time after each gear shift but eventually begins to level off as the time to change gears approaches. Efficiency is impaired before and after each gear shift since, at these times, the bicycle is not moving at the speed that is optimum for the particular gear ratio to which the ten-speed "transmission" is set. Curve D shows the relationship in a theoretical situation where operator error has been eliminated, while Curve E indicates the relationship including expected operator error.

Modifications of the structure herein can be made while remaining within the spirit and scope of this invention.

What is claimed is:

1. In a bicycle including
   a hand control means mounted on a handlebar of the bicycle having pedal means,
   a non-stepped, continuously variable transmission means having a control member connected to said hand control means,
   said transmission means having a rotatable input shaft and a rotatable output shaft, the ratio of rotation of the two shafts being continuously variable upon movement of said control member,
   a first drive means for driving the input shaft, said first drive means connecting said pedal means and said input shaft, and
   a second drive means for driving a wheel connected to a hub of the bicycle, said second drive means connecting said output shaft and said hub
   the improvement consisting of the inclusion of
   a governor means for automatically adjusting the variable ratio of the transmission in response to the forward speed of said bicycle.

2. The bicycle improvement of claim 1, wherein said governor means connects the hub of the wheel to said transmission means and includes
   bearing means in contact with said hub,
   said bearing means being encased within and adjustable retaining member having a weight member hanging substantially vertically therefrom,
   said weight member being connected to the control member of the transmission means, whereby the control member is moved in one direction to raise the ratio of the number of revolutions of the wheel relative to the number of revolutions of the pedal means when the speed of rotation of the wheel is decreased, and whereby the control member is moved in an opposite direction to lower said ratio when the speed of rotation of the wheel is increased.

3. The bicycle improvement of claim 1, wherein said governor means is inside said transmission means and connects said rotatable output shaft with an extension of said control member.

4. The bicycle improvement of claim 3, wherein said inside governor means includes
   bearing means in contact with said output shaft,
   said bearing means being encased within an adjustable retaining member having a hanger member depending substantially vertically therefrom,
   said hanger member being connected to a push member at one end thereof,
   the other end of said push member being pivotally connected to said extension of the control member,
   whereby the control member is moved in one direction to raise the ratio of rotation of the output shaft relative to the input shaft when the speed of rotation of the output shaft is decreased, and whereby the control member is moved in the other direction to lower said ratio when the output shaft rotation speed is increased.

* * * * *